(12) United States Patent
Baphna et al.

(10) Patent No.: US 9,886,867 B2
(45) Date of Patent: Feb. 6, 2018

(54) SIMULATION BASED LEARNING SYSTEM AND METHOD FOR TRAINING AND SCORING ONE OR MORE CHALLENGES TAKEN BY A USER

(71) Applicant: Analyttica Datalab Inc., Wilmington, DE (US)

(72) Inventors: Rajiv Baphna, Bangalore (IN); Satyamoy Chatterjee, Bangalore (IN); Halasya Siva Subramania, Bangalore (IN); Ashutosh Joshi, Bangalore (IN)

(73) Assignee: Analyttica Datalab Inc., Wilmington, DE (US)

( * ) Notice: Subject to any disclaimer, the term of this patent is extended or adjusted under 35 U.S.C. 154(b) by 235 days.

(21) Appl. No.: 14/477,843

(22) Filed: Sep. 4, 2014

(65) Prior Publication Data

US 2015/0064677 A1 Mar. 5, 2015

(30) Foreign Application Priority Data

Sep. 5, 2013 (IN) .......................... 3975/CHE/2013

(51) Int. Cl.
*G09B 5/00* (2006.01)
*G09B 7/00* (2006.01)
*G09B 5/08* (2006.01)
*G09B 7/04* (2006.01)

(52) U.S. Cl.
CPC .............. *G09B 7/00* (2013.01); *G09B 5/00* (2013.01); *G09B 5/08* (2013.01); *G09B 7/04* (2013.01)

(58) Field of Classification Search
CPC ... G09B 5/00; G09B 5/08; G09B 7/00; G09B 7/02; G09B 7/04
See application file for complete search history.

(56) References Cited

U.S. PATENT DOCUMENTS

| 2002/0168621 | A1* | 11/2002 | Cook | ....................... G09B 7/00 434/350 |
| 2009/0142742 | A1* | 6/2009 | Goldberg | ................. G09B 7/02 434/362 |
| 2010/0331064 | A1* | 12/2010 | Michelstein | ........... G06Q 10/10 463/1 |

* cited by examiner

*Primary Examiner* — Robert J Utama
(74) *Attorney, Agent, or Firm* — Clegg, P.C.; Perry S. Clegg

(57) ABSTRACT

A processor implemented method for scoring a challenge taken by a user, and training the user using a simulation based learning platform is provided. The processor implemented method includes (i) obtaining, from a database, challenges to be taken by a user and associated at least one of information, (iii) processing a selection of, the challenge from the challenges with actions or steps performed by the user, (iv) rendering, hints to solve the challenge, (v) recording, steps taken by the user to solve the challenge, (vi) comparing the steps taken by the user with steps taken by an expert to solve the challenge to compute a deviance of the user from a reference path, (vii) scoring, the challenge based on the deviance of the user from the reference path to obtain a score, and (viii) notifying, a result associated with the challenge to the user based on the score.

23 Claims, 13 Drawing Sheets

FIG. 5

| | | Course Manager | Leader board | |
|---|---|---|---|---|
| Course details ▷ | Challenge – Factor Influencing Bank Deposit | | | |
| Milestones ▷ | Data Table | Output | Progress | 1/26 |
| | | | Submit | |
| Hint ▷ | Data management ▷ Machine Learning ▷ Mathematics ▷ Plots ▷ | | | |

TH_Bank_Challenge

| S.No | Household_ID | Customer_ID | Account_ID | Deposit type |
|---|---|---|---|---|
| 1 | 1 | 4545 | 4513 | CDS |
| 2 | 1 | 131 | 6789 | CHK |
| 3 | 1 | 7896 | 5148 | CDS |
| 4 | 7 | 5478 | 5692 | SAV |
| 5 | 7 | 1204 | 4213 | MMA |
| 6 | 7 | 1436 | 3520 | CDS |
| 7 | 7 | 7563 | 1041 | SAV |
| 8 | 8 | 1574 | 3026 | CDS |
| 9 | 8 | 3698 | 4013 | SAV |
| 10 | 8 | 6514 | 8961 | CHK |
| 11 | 8 | 9865 | 9632 | CDS |

Account number is the primary key of the table which should be unique

Get Hint

User Steps ▷

SIMULATION BASED LEARNING SYSTEM AND METHOD FOR TRAINING AND SCORING ONE OR MORE CHALLENGES TAKEN BY A USER

CROSS-REFERENCE TO RELATED APPLICATIONS

This application claims priority to Indian patent application no. 3975/CHE/2013 filed on Sep. 5, 2013, the complete disclosure of which, in its entirely, is herein incorporated by reference.

BACKGROUND

Technical Field

The embodiments herein generally relate to learning management system, and more particularly to simulation based learning system and method for training and scoring one or more challenges taken by a user.

Description of the Related Art

Learning in analytics or related fields currently is highly focused on knowing the tools as against the concepts i.e. focused on 'how' to apply as against 'what' and 'when' to apply, which is more fundamental to learning. This translates to knowing the underlying 'statistical packages/product/code' than on statistical concepts. The current mode of education (in statistics and analytics or other related fields) is through online learning, video sessions or personal training, mostly in unilateral direction (one way learning). The current model of online education or in-person is non-scalable and requires availability of the right talent to teach, which is a constraint in most cases. The online education mode relies on 'one size fits all' approach, which does not yield right results considering the diversity of talent and it doesn't customize learning to individual needs. There are various learning platforms out in the market, which control user's steps and activities at very granular level. Accordingly, there remains a need for platform with experience based learning to individual needs which allows a user to experience real life scenarios with better interactive learning in real time and in a collaborative manner.

SUMMARY

In view of the foregoing, an embodiment herein provides a processor implemented method for scoring one or more challenges taken by a user, and training the user using a simulation based learning platform. The processor implemented method includes (i) obtaining, from a database, a plurality of challenges to be taken by a user, (ii) obtaining, at least one of information associated with the one or more challenges, (iii) processing a selection of, at least one challenge from the one or more challenges with at least one actions or steps performed by the user, (iv) rendering, one or more hints to solve the at least one challenge, (v) recording, one or more steps taken by the user to solve the at least one challenge, (vi) comparing the one or more steps taken by the user with one or more steps taken by an expert to solve the at least one challenge to compute a deviance of the user from a reference path, (vii) scoring, the at least one challenge based on the deviance of the user from the reference path to obtain a score, and (viii) notifying, a result associated with the at least one challenge to the user based on the score. The at least one of information associated with the one or more challenges is selected from a group includes (a) a description, (b) an objective, (c) data sets that are created or provisioned, (d) rules of navigation, (e) key steps, and (f) success criteria among other related components.

The processor implemented method may further includes (i) computing, by a rule engine module, custom rules for the data sets which are build based on a type of data, or (ii) applying, an existing or newly-built rules to the datasets corresponding to the user challenge. The one or more hint may provided to the user (i) upon receiving one or more prompts from the user, (ii) at predetermined time intervals based on one or more steps taken by the user to solve the challenge, (iii) a user level, (iv) admin settings, and (v) user proficiency. The processor implemented method may further includes, providing, one or more solutions includes one or more steps taken to solve the at least one of challenge by (a) one or more experts, or (b) one or more users to the users, the one or more solutions further includes (i) one or more recommendations or one or more suggestions to solve the at least one challenge, (ii) one or more reasons for the one or more steps taken to solve the at least one challenge by the one or more experts or the one more users, or (iii) combination thereof.

The processor implemented method may further includes, displaying one or more analytical functions to be used in the one or more steps to solve the at least one challenge. The one or more analytical functions may be displayed based on one or more solutions obtained from the one or more experts or the one or more users. The score may be calculated based on one or more parameters selected from a group includes (i) a time taken to solve the at least one challenge, (ii) sequence of steps taken, (iii) usage of the one or more analytical functions in the one or more steps to solve the at least one challenge, (iv) one or more hints used to solve the at least one challenge, (v) exhaustiveness of functions among other parameters to arrive at user score, and (vi) answers to intermediate questions within the at least one challenge and at end of the at least one challenge.

In one aspect, a computer implemented system for scoring one or more challenges taken by a user and training the user using a simulation based learning platform is provided. The computer implemented system includes (i) a memory unit that stores (a) a set of modules, (b) a database, and instructions; (ii) a processor when configured by the instructions executes the set of modules. The database includes at least one of (i) store one or more user information, and (ii) information corresponding to content related to course and challenge. The set of modules includes (a) a challenge information obtaining module, executed by the processor, that obtains at least one of information associated with one or more challenges, the one or more challenges are obtained from the database, (b) a challenge selection module, executed by the processor, that processes a selection of, at least one challenge from the one or more challenges one or more actions or one or more steps performed by the user, (c) a hint rendering module, executed by the processor, that renders one or more hints to solve the at least one challenge, (e) a steps comparing module, executed by the processor, compares the one or more steps taken by the user with one or more steps taken by one or more experts to solve the at least one challenge to compute a deviance of the user from a reference path, (f) a scoring module, executed by the processor, that scores the at least one challenge based on the deviance of the user from the reference path to obtain a score.

The processor implemented method may further includes, providing, one or more solutions are provided in a format selected from a group includes, (i) one or more audio, (ii) one or more video, (iii) one or more text, or (iv) a combination thereof. The processor implemented method may further includes, (i) tracking a progress associated with the at least one challenge, (ii) displaying a progress indicator for the at least one challenge taken by the user. The progress indicator may include (i) a progress level of the user associated with the at least one challenge, or (ii) a comparison of a performance between (i) the user and the one or more experts, (ii) the user and the one or more users, or (iii) combinations thereof. The performance includes the one or more parameters.

The computer implemented system may further includes, a rule engine module, executed by the processor, that (i) computes custom rules for the data sets which are build based on a type of data, or (ii) applying, an existing or newly-built rules to the datasets corresponding to the user challenge. The one or more hints may be provided to the user (i) upon receiving one or more prompts from the user, (ii) at predetermined time intervals based on one or more steps taken by the user to solve the challenge, (iii) a user level, (iv) admin settings, and (v) user proficiency. The at least one of information associated with the plurality of challenges may be selected from a group includes (i) a description, (ii) an objective, (iii) data sets that are created or provisioned, (iv) rules of navigation, (v) key steps, and (vi) success criteria among other related components.

The computer implemented system may further includes, a notification module, executed by the processor, notifies results associated with the one or more challenges to the user based on gamification elements. The one or more solutions may includes one or more steps taken to solve the at least one of challenge provided by (a) one or more experts, or (b) one or more users to the users. The one or more solutions may further includes (i) one or more recommendations or one or more suggestions to solve the at least one challenge, (ii) one or more reasons for the one or more steps taken to solve the at least one challenge by the one or more experts or the one more users, or (iii) combinations thereof. The computer implemented system may further includes, a display module when executed by the processor displays one or more analytical functions to be used in the one or more steps to solve the at least one challenge. The one or more analytical functions are displayed based on one or more solutions obtained from the one or more experts or the one or more users.

The score may be calculated based on one or more parameters selected from a group includes (i) a time taken to solve the at least one challenges, (ii) sequence of steps taken, (iii) usage of the one or more analytical functions in the one or more steps to solve the at least one challenge, (iv) one or more hints used to solve the at least one challenge, (v) exhaustiveness of functions among other parameters to arrive at user score, and (vi) answers to intermediate questions within the at least one challenge and at end of the at least one challenge.

The computer implemented system may further includes, a playback module, executed by the processor, that playbacks each step taken by the user or the expert while solving the at least one of challenge. The computer implemented system may further includes, (i) a progress tracking module that tracks a progress associated with the at least one challenge is tracked, (ii) display a progress indicator for the at least one challenge taken by the user. The progress indicator may include (i) the progress of the user associated with the at least one challenge, or (ii) a comparison of a performance between (i) the user and the one or more experts, (ii) the user and the one or more users, or (iii) combinations thereof. The performance includes the one or more parameters. The computer implemented system may further include a performance determination module, executed by the processor that determines a performance level based on at least a subset of the plurality of challenges taken by the user. The computer implemented system may further include a training determination and recommendation module, executed by the processor, that (a) determines a knowledge level based on the performance level during an attempt made by the user to solve (i) the at least one challenge, (ii) the subset, or (iii) the plurality of challenges, and (b) recommends one or more training courses based on (i) the performance level or (ii) the knowledge level to solve subsequent challenges.

In yet another aspect, one or more non-transitory computer readable storage mediums storing one or more sequences of instructions, which when executed by one or more processors is provided. One or more non-transitory computer readable storage mediums includes (i) obtaining, from a database, a plurality of challenges to be taken by a user, (ii) obtaining, at least one of information associated with the one or more challenges, (iii) processing a selection of, at least one challenge from the one or more challenges with at least one actions or steps performed by the user, (iv) rendering, one or more hints to solve the at least one challenge, (v) recording, one or more steps taken by the user to solve the at least one challenge, (vi) comparing the one or more steps taken by the user with one or more steps taken by an expert to solve the at least one challenge to compute a deviance of the user from a reference path, (vii) scoring, the at least one challenge based on the deviance of the user from the reference path to obtain a score, and (viii) notifying, a result associated with the at least one challenge to the user based on the score. The at least one of information associated with the one or more challenges is selected from a group includes (a) a description, (b) an objective, (c) data sets that are created or provisioned, (d) rules of navigation, (e) key steps, and (f) success criteria among other related components. The one or more non-transitory computer readable storage mediums may further include determining a performance level based on at least a subset of the plurality of challenges taken by the user.

The one or more non-transitory computer readable storage mediums, further include, (a) determining a knowledge level based on the performance level during an attempt made by the user to solve (i) the at least one challenge, (ii) the subset, or (iii) the plurality of challenges, and (b) recommending one or more training courses based on (i) the performance level or (ii) the knowledge level to solve subsequent challenges.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 5 illustrates a user interface view of receiving one or more hints while solving the at least one challenge according to an embodiment herein;

DETAILED DESCRIPTION OF PREFERRED EMBODIMENTS

Figure 1:
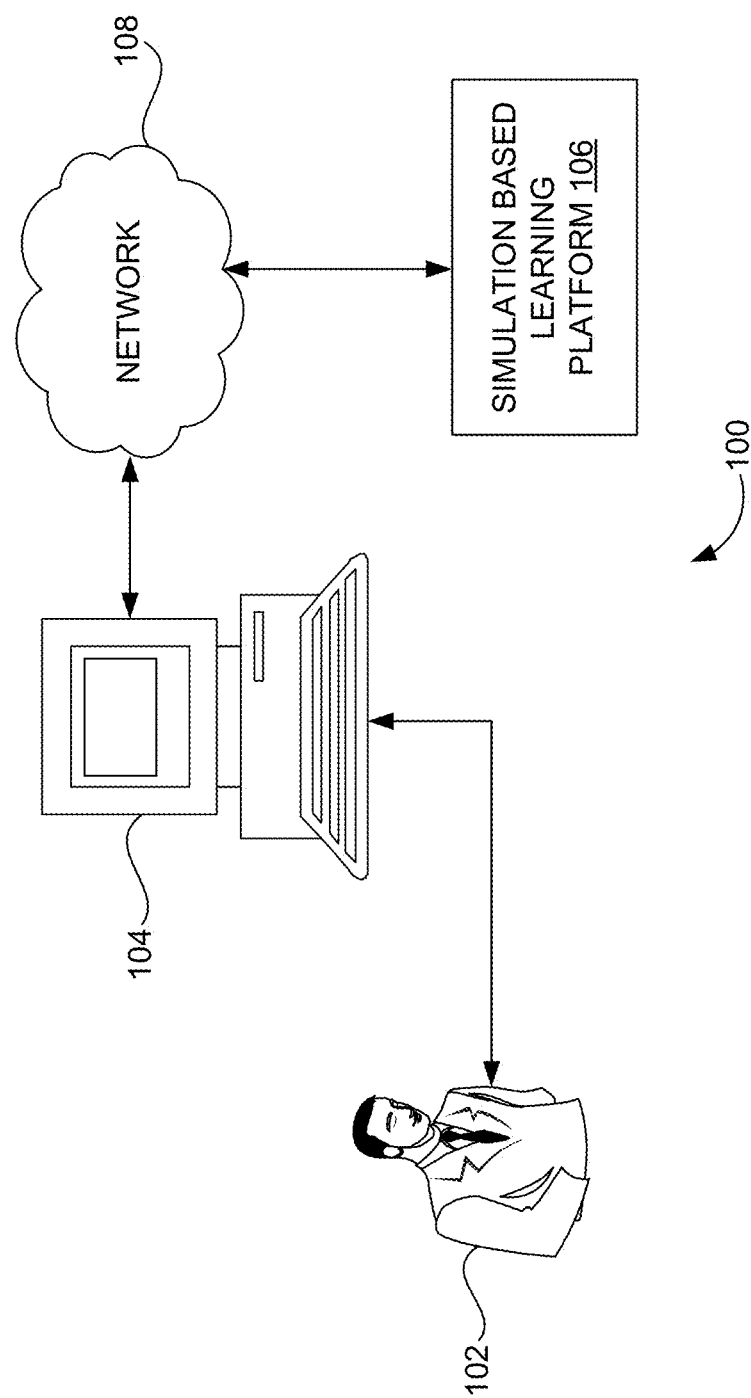
FIG. 1 illustrates a system view of a user interacting with an simulation based learning platform through a computing device for data oriented learning according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for platform with experience based learning to individual needs which allows a user to experience real life scenarios and explore the options and analyze data with better interactive learning on real time. The embodiments herein achieve this by providing an interactive-learning platform for data oriented learning with focuses on one or more application of concepts based on simulation of real business scenarios also by providing scenarios with appropriate data sets and interfaces to tools. A simulation based learning platform provides a simulation based learning system and method for scoring one or more challenges taken by a user and trains the user. Referring now to the drawings, and more particularly to FIGS. 1 through 13, where similar reference characters denote corresponding features consistently throughout the figures, there are shown preferred embodiments.

FIG. 1 illustrates a system view of a user 102 interacting with a simulation based learning platform 106 through the computing device 104 for data oriented learning according to an embodiment herein. The system 100 includes the user 102, a computing device 104, a simulation based learning platform 106, and a network 108. The user 102 interacts with the simulation based learning platform 106 through the computing device 104 for interactive-learning on data oriented learning (e.g., analytics, science) which focuses on one or more application of concepts based on simulation. In one embodiment, the simulation based learning platform 106 is a web-based interactive-learning platform for analytics which incorporates elements of serious-games such as simulation and gamification along with machine-learning, collaboration, and intelligent scoring. In one embodiment, the simulation based learning platform 106 may be breaking of learning into concept of applications which are unique to a user.

In one embodiment, the system may render a user action into corresponding code required by the platform. For e.g. if a package chosen is 'R', an R-code is generated by the underlying system for the user action. In one embodiment, converting a user action (e.g., a user clicks) to various programming or computing instructions (e.g., R, SAS codes) with scores and assessment (areas of improvement) for experiential learning on analytics. In one embodiment, learning may be segmented into at least two phases (e.g., concept and execution using appropriate package. In one embodiment, the simulation based learning platform 106 is implemented in the computing device 104.

In another embodiment, the simulation based learning platform 106 is implemented in a remote server. In one embodiment, the simulation based learning platform 106 communicates with the computing device 104 through the network 108. In another embodiment, the network may be an internet. In one embodiment, the computing device 104 is selected from a group comprising a personal computer, a mobile communication device, a smart phone, a tablet PC, a laptop, a desktop, and an ultra-book.

Figure 2:
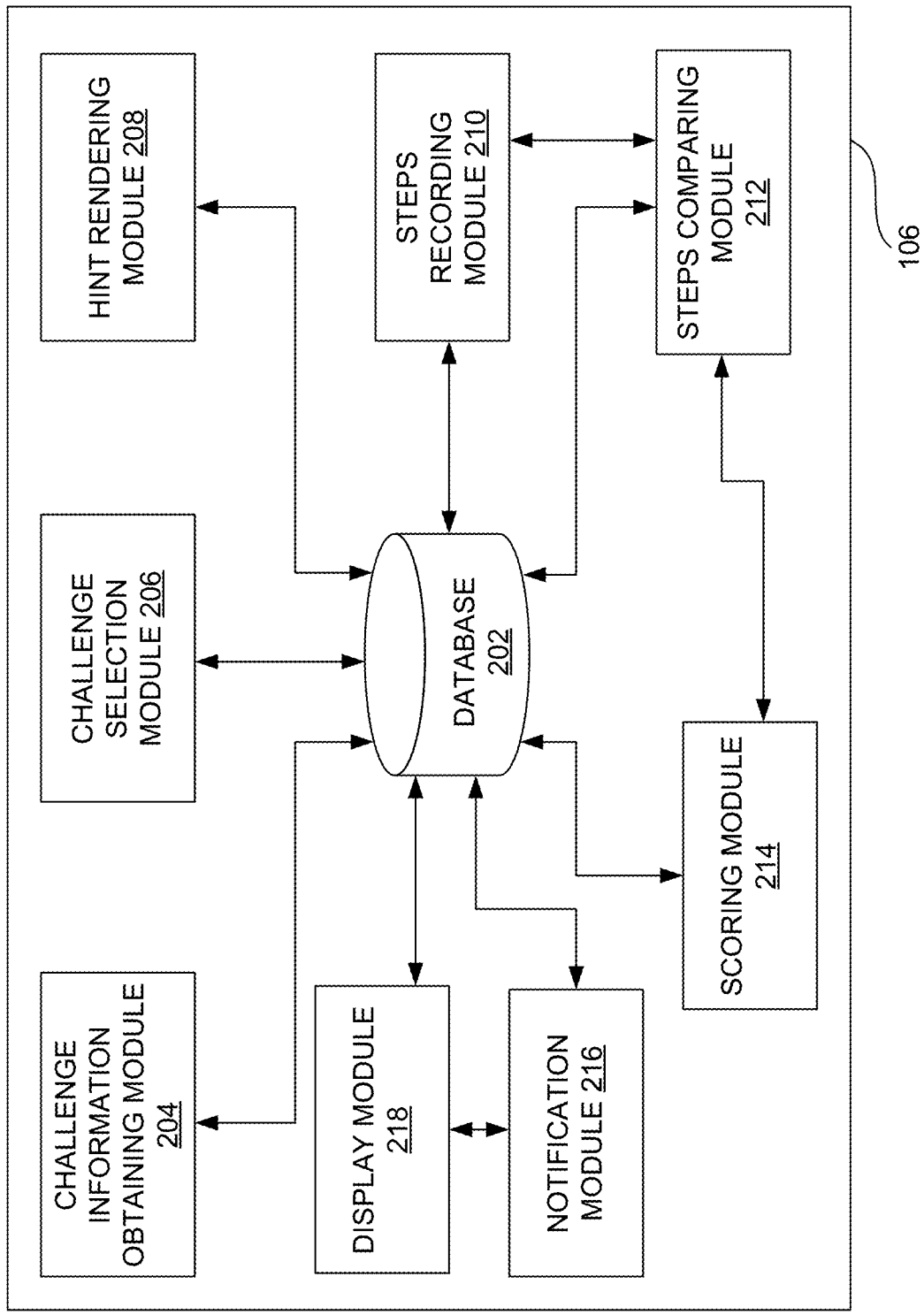
FIG. 2 illustrates an exploded view of the simulation based learning platform according to an embodiment herein.

FIG. 2 illustrates an exploded view of the simulation based learning platform 106 according to an embodiment herein. The exploded view 106 includes a database 202, challenge information obtaining module 204, a challenge selection module 206, a hint rendering module 208, a steps recording module 210, a steps comparing module 212, a scoring module 214, and a notification module 216. In one embodiment, a database 202 that store (i) one or more user information, and (ii) information corresponding to content related to course and challenge. In one embodiment, the database 202 may reside in remote server. For example, information associated with a plurality of challenges is retrieved from a database (Not shown in figure). The challenge information obtaining module 204 obtains at least one of information associated with a plurality of challenges. The plurality of challenges may be obtained from the database 202. In one embodiment, one or more lesson/challenge may have success criteria and the success criteria may be within the challenge/lesson as well.

The challenge selection module 206 processes a selection of, at least one challenge from the plurality of challenges with at least one or more actions or one or more steps performed by the user. The hint rendering module 208 renders one or more hints to solve the at least one challenge selected by the user. The one or more hints is provided to the user (i) upon receiving one or more prompts from the user, (ii) at predetermined time intervals based on one or more steps taken by the user to solve the challenge, (iii) based on a user level, (iv) one or more administrative settings, and (v) a user proficiency.

For example, the hint rendering module 208 may be chosen during such modes of training which may render a right hint and one or more instructions to the user/trainee, (i) when the user/trainee prompts for a hint or (ii) when the system requires an appropriate time to provide hint based on a solution path taken by the user/trainee. For example, outcome of the hint which is used by the user/trainee is communicated to the scoring engine 214 and evaluator which helps to arrive at final score for the exercise/challenge. The hint rendering module 208 may be configured up to be collaborative, where users who are solving a challenge which are provided with hints from users/trainees who have solved the challenge earlier. The one or more instructions are rendered to the user 102 while solving the at least one of challenge.

The steps recording module 210 records one or more steps taken by the user 102 to solve the at least one challenge. In one embodiment, the steps recording module 210 may include built-in intelligence to identify which are exploratory steps and which are the steps which alter the data. In one embodiment, one or more steps taken by the user/trainee may be displayed with hyperlink in order to scroll back to the steps preferred by the user while executing the challenge. In one embodiment, one or more steps are highlighted with one more color code in order to specify a status of the one or more steps and/or progress of a challenge (e.g., start, completed) by the user. In another embodiment, the steps recording module 210 interacts with the scoring module 214 to compute deviance of the user/trainee from a reference path.

The simulation based learning platform 106 includes a playback module, that playback each step taken by the user or the expert while solving the same challenge. For example, the user 102 checks previous steps and next steps while solving the case to avoid error/correction. In one embodiment, the playback option may be used as a mode of learning in which a learner pickup challenges from the challenge repository module and replay how various experts have solved the challenge. In one embodiment, the playback module provide an option of accessing a comparison one or more steps, e.g., comparing the steps taken by the user/trainee and the steps taken by the expert is viewed.

The steps comparing module 212 compares the one or more steps taken by the user with one or more steps taken by one or more experts to solve the at least one challenge to compute a deviance of the user from a reference path. In one embodiment, one or more solutions provided which includes one or more steps taken to solve the at least one of challenge by (a) one or more experts, or (b) one or more users to the users. One or more solutions further includes (i) one or more recommendations or one or more suggestions to solve the at least one challenge, (ii) one or more reasons for the one or more steps taken to solve the at least one challenge by the one or more experts or the one more users, or (iii) combination thereof.

The scoring module 214 scores the at least one challenge based on the deviance of the user from the reference path to obtain a score. The score is calculated based on one or more parameters selected from a group includes (i) a time taken to solve the at least one challenge, (ii) sequence of steps taken, (iii) usage of the one or more analytical functions in the one or more steps to solve the at least one challenge, (iv) one or more hints used to solve the at least one challenge, (v) exhaustiveness of functions among other parameters to arrive at user score, and (vi) answers to intermediate questions within the at least one challenge and at end of the at least one challenge.

A display module 218 that displays one or more analytical functions to be used in the one or more steps to solve the at least one challenge. The one or more analytical functions are displayed based on one or more solutions obtained from the one or more experts or the one or more users. The simulation based learning platform 106 may further include a progress tracking module that tracks a progress associated with the at least one challenge is tracked. Then, a progress indicator for the at least one challenge taken by the user is displayed. The progress indicator may include at least one of (i) the progresses of the user associated with the at least one challenge, or (ii) a comparison of a performance between (i) the user and the one or more experts, (ii) the user and the one or more users, or (iii) combinations thereof. In one embodiment, the performance includes the one or more parameters. The simulation based learning platform 106 may further include a rule engine module that (i) computes custom rules for the data sets which are build based on a type of data, or (ii) applying, an existing or newly-built rules to the datasets corresponding to the user challenge. In one embodiment, the custom rules are rules that are applicable for certain variables or columns based on the context of data. For example, a "customer ID" and an "age" are both numeric, but they can't be treated in a similar manner. The customer ID may be primary, in which case, in which one treat the missing values by replacing with median or mode, whereas this rule is not applicable to "Age". Similarly, the rules may apply if data sets or columns are marked as continuous or descriptive etc. In one embodiment, the custom rules are driven by context and variable types marked and tagged while uploading the data or while creating the plurality of challenge.

The simulation based learning platform 106 may further include an identity and access management module performs authentication and authorization of a user along with user's session management and self-service module. The simulation based learning platform 106 may further include a challenge repository module which facilitates creation of the plurality of challenges/lessons and stores the plurality of challenges. For example, at least one of information associated with the plurality of challenges is at least one of (i) a description, (ii) an objective, (iii) data sets that may be created or provisioned, (iv) rules of navigation, (v) key steps, and (vi) success criteria among other related components. The key steps are mandatory steps as per an expert that has to be followed by the user to solve the at least one challenge. A few steps may be exploratory (e.g., drawing charts) which is more to get a sense of data, while a few of them (e.g., regressions) are necessary within a challenge depending on the challenge's objective.

The simulation based learning platform 106 may further include a course managing module manages one or more courses together and associates the one or more courses under each sub-category. In one embodiment, there the one or more courses may include at least one of (i) an associated tagging and (ii) a hierarchy system. For example, the one or more courses are tagged with appropriate keywords which may be indexed and searchable by a user. The courses uploaded may be placed under an appropriate hierarchy system (e.g. Subject->Topic->Chapter->Lessons (or) Industry->Sub-industry->Topic->Challenge). The simulation based learning platform 106 may further include a course uploader module may provide an option for experts and/or tutors to upload courses/challenges/cases which can be solved by other users. The simulation based learning platform 106 may further include a statistics package updating module allows automated enhancement of statistical functions within the simulation based learning platform 106, but not limited to, may be added and build on existing statistical modules.

The notification module 216 notifies results associated with the plurality of challenges to the user based on gamification elements. For example, the gamification elements are points, badges, level unlock leadership boards to engage users with better notification. In one embodiment, the notification module 216 may provide the notification (e.g., multimedia content) to the user 102. For example, the multimedia content may be an audio representation, text representation, video representation, and icon representation. In one embodiment, the notification module 216 may interact with other modules such as scoring module 214, course managing module and evaluator.

The simulation based learning platform 106 may further include a machine learning module includes machine learning component allowing system to mature in discovering the optimal/recommended path for challenges and cases. In one embodiment, an optimal path generated by the machine learning component may be used to scale up and grade users accordingly. The simulation based learning platform 106 may further include a user dashboard module may provide one or more functionality to track user progress and status. In one embodiment, the notification module 216 may interact with the user dashboard module to provide a snapshot of the gamification elements earned by the user 102. In one embodiment, mailbox may be accessible from the user dashboard module. The simulation based learning platform 106 may further include a management information system (MIS) module may provide a reports and progress cards at a user, group or institution level. The simulation based learning platform 106 may further include a feedback and collaboration module provides components to collect feedback at a course or module or platform level. In another embodiment, the feedback and collaboration module may provide collaboration e.g., chat, forums, email, discussion boards for enabling a better interaction among users and/or between system and the user.

Figure 3:
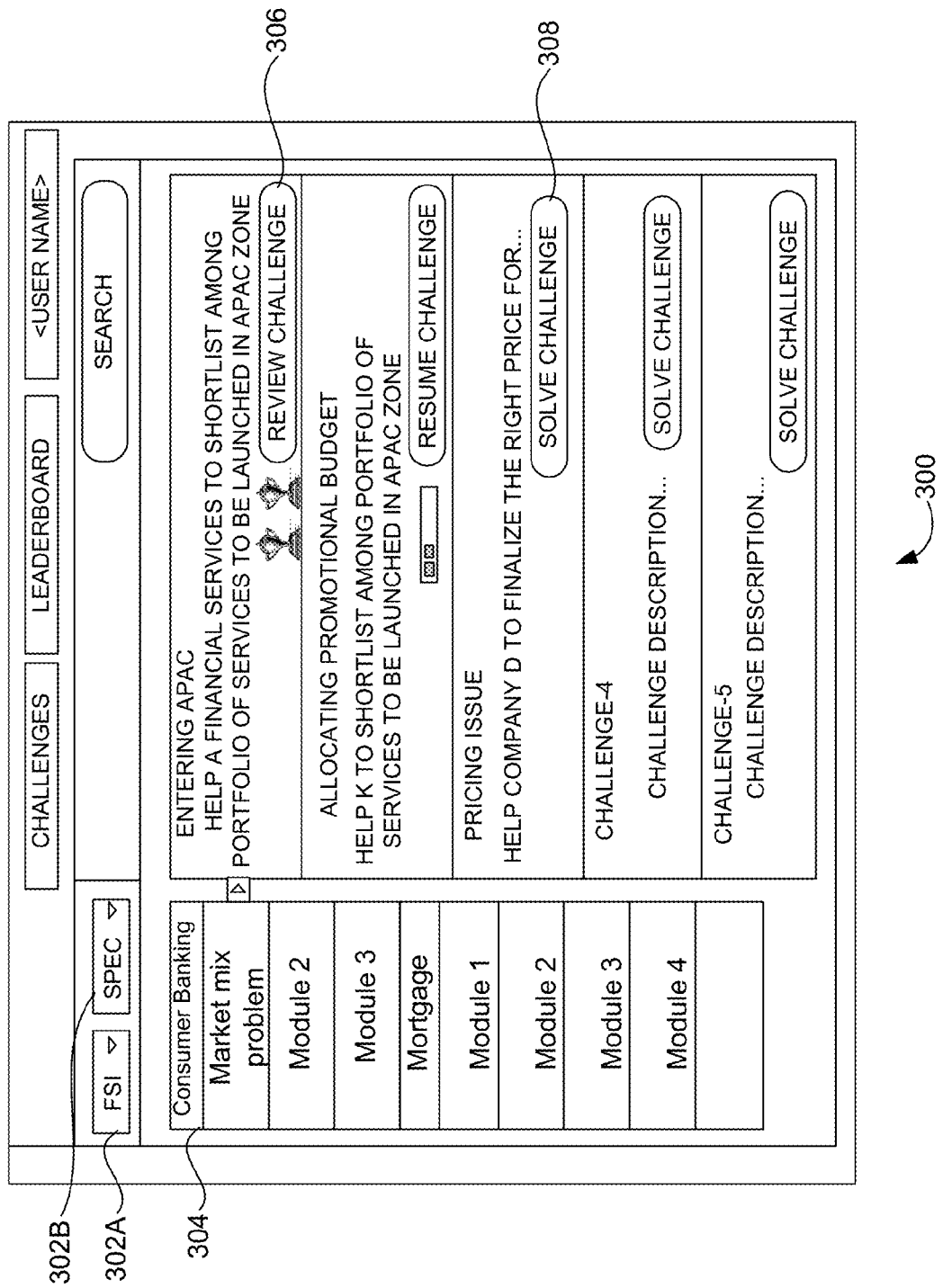
FIG. 3 illustrates an user interface view of interaction with an simulation based learning platform through a computing device for data oriented learning according to an embodiment herein.

FIG. 3 illustrates a user interface view 300 of interaction with the simulation based learning platform 106 through a computing device for data oriented learning according to an embodiment herein. The view 300 includes a category field 302A, a specification field 302B, a classification field 304, a review challenge field 306, and a solve challenge field 308. In one embodiment, when a user clicks on the category field 302, one or more categories (e.g., a financial service industry) are displayed. The specification field 302B provides information regarding a domain (e.g., finance, and retail) of learning. The classification field 304 classifies an industry (e.g., consumer banking). In one embodiment, one or more challenge with corresponding status (e.g., review, resume, solve) for a user action is displayed. The review challenge field 306 which helps to review a challenge completed by a user. For example, a challenge completed by a user is ready for review or redo. The solve challenge field 308 displays one or more challenges for solving. For example, when a user clicks on the solve challenge field 308 the user can proceed with the challenge for solving. In one embodiment, title of a challenge corresponding description may be displayed to the user 102. In one embodiment, the user 102 may resume with challenge at an interrupted stage (e.g., when a user pauses before completion of the challenge) when the user clicks on 'a resume challenge' field.

Figure 4:
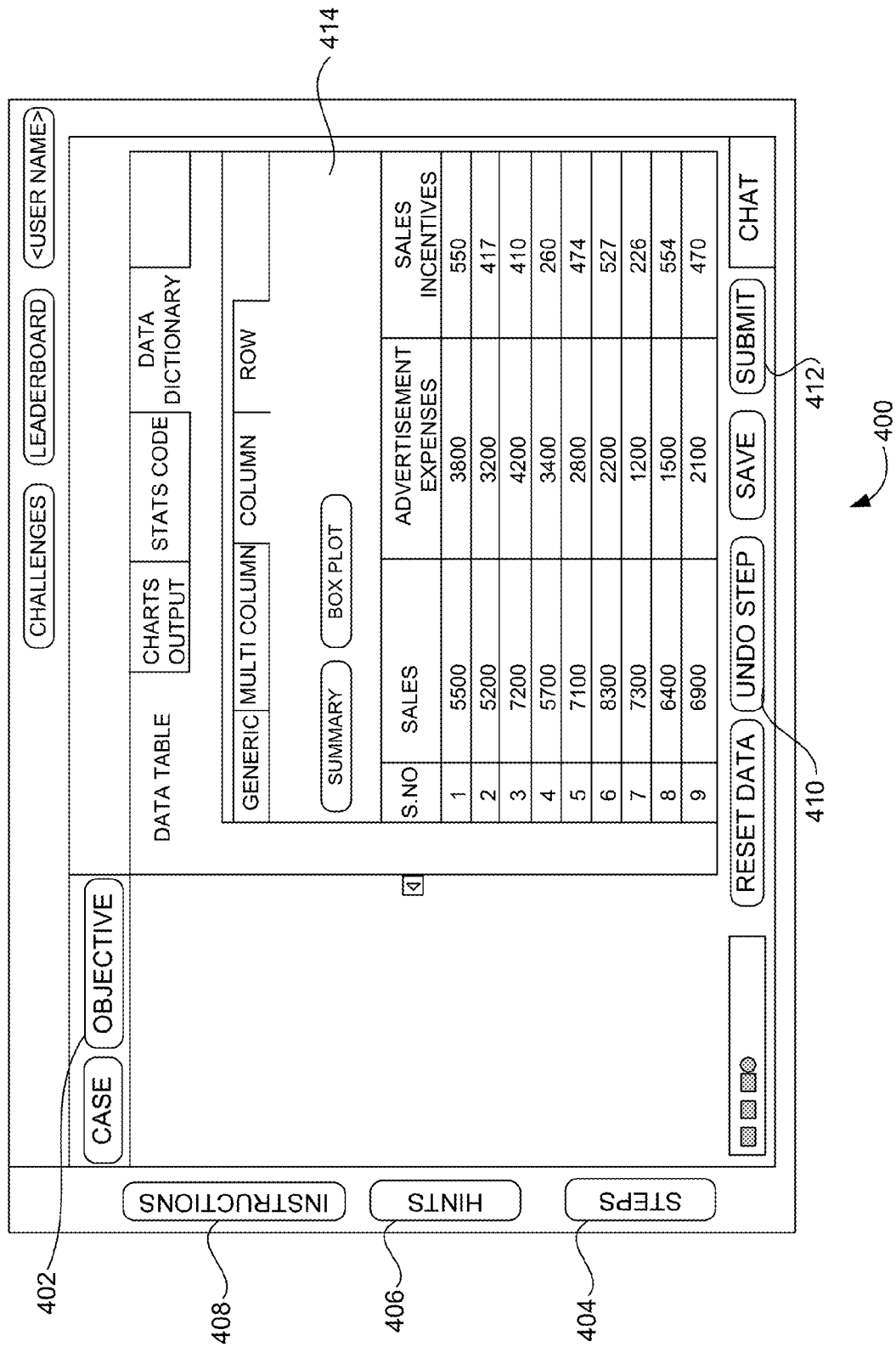
FIG. 4 illustrates a user interface view of a user solving an at least one challenge to achieve an interactive-learning according to an embodiment herein.

FIG. 4 illustrates a user interface view of a user 102 solving a challenge to achieve an interactive-learning according to an embodiment herein. The view includes an objective field 402, a steps field 404, a hints field 406, an instructions field 408, an undo step field 410, a submit field 412, and datasets field 414. In one embodiment, when a user clicks on a case field which displays a business case. For example, the case field explains business problem, analytics problem, client's dilemma, overall expectation of a client, and an overview of what a data represents. In one embodiment, a data dictionary field provides information corresponding to one or more data's in the column for a particular challenge. In one embodiment, data is a sample of a customer base having 3 Identifiers (ID). For example, (i) household ID which represents a unique identifier for the household (one household can have multiple customers and each customer can have multiple accounts), (ii) an Customer ID which represents a unique customer, and (iii) an account ID which represents an account.

In one embodiment, when a user clicks on the objective field 402 which provides a list of objectives for the challenge. For example, the user needs to solve an analytics problem such as three objectives 'objective 1', 'objective 2', 'objective 3'. For example, an objective in which determine which of following factors (i) Household size, (ii) Household age, (iii) Home ownership status, (iv) Marital status, (v) Wealth segment, and (vi) Vintage of the relationship have influence on a volume of household deposit balance with a bank and an overall deposit balance respectively. Rank order by influencing factors and compare the influence to bank's deposit balance and overall deposit balance.

In one embodiment, when a user clicks on the steps field 404 one or more steps performed by a user to solve a challenge are displayed and the steps are updated as and when the user modifies the steps. In one embodiment, when a user clicks on the hints field 406 which facilitate an hint which is displayed for completing instructions and helps the user to progress further to complete the challenge also address most of concerns the user. In one embodiment, functions to achieve the instruction are conveyed to the user. In one embodiment, when a user clicks on the instructions field 408 the instruction for solving the challenge is conveyed to the user. In one embodiment, when a user clicks on the undo step field 410 th platform helps to undo a particular step when an error occurs while performing a challenge. In another embodiment, when the user clicks on the undo step 410 which helps he/she to proceed in right way while performing the challenge. The user clicks on the submit field 412, once he/she completes all the involved within the challenge. In one embodiment, the user may chat with other user/trainee/experts while taking up the challenge.

In one embodiment, instructions support how to break down the case into smaller parts for analysis. In one embodiment, the hints are requested by the user (but not limited to, accessing hints affects a user's score). For example, upon clicking on the hint icon, an appropriate hint is displayed to the user based on user's current position. Similarly, 'Functions' are the right steps which are recommended by expert, in order to successfully complete the instruction. In one embodiment, 'Context/Column' field represents the column/row/cell on which the recommended 'function' may be performed. In one embodiment, 'Blacklisted rules' represents a definite 'No'-'No' in which points are deducted for these actions. In one embodiment, a chart output field displays output to the user in a chart format.

FIG. 5 illustrates a user interface view of receiving one or more hints while solving the at least one challenge according to an embodiment herein. The view 500 includes a hint rendering field 502. The hint rendering field 502 renders one or more hints to the user while solving the at least one challenge. For example, the user while solving bank challenge the one or more hints are provided such as "Account number is the primary key of the table which should be unique". There is a provision for the user 102 to access one or more hints if the one provided is not helping the user to solve the one or more steps associated with the at least one challenge.

Figure 6:
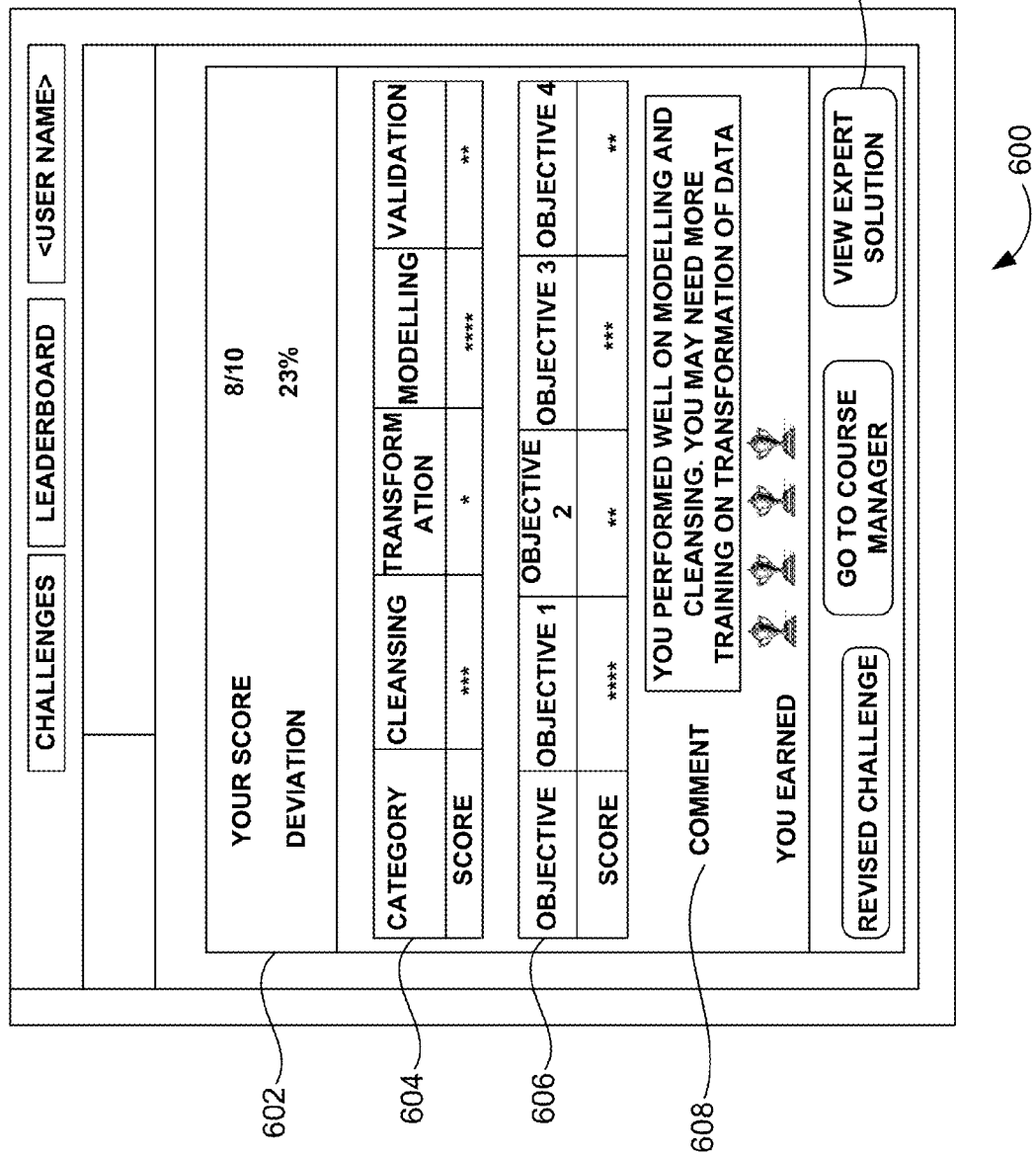
FIG. 6 illustrates a user interface view of a user score sheet for the challenge taken by a user according to an embodiment herein.

FIG. 6 illustrates a user interface view of a user score sheet for the challenge taken by a user according to an embodiment herein. The view 600 includes a score field 602, a category score field 604, an objective score field 606, a comment field 608, and a view expert solution field 610. The score field 602 displays a score and percentage of deviation achieved by the user for a challenge. The category score field 604 displays a score achieved by the user based on the category. Similarly, the objective score field 606 displays a score achieved by the user for corresponding objectives. The comment field 608 which display comment by an expert/system for the user score sheet and one or more approaches taken by the user 102 while solving the challenge. In one embodiment, once the user 102 clicks on the view expert solution field 610 redirected to expert solution page for corresponding challenge. In one embodiment, the user may compare execution steps of a user with execution steps of an expert while performing a challenge to determine one or more deviation and to observe the expert approach.

Figure 7:
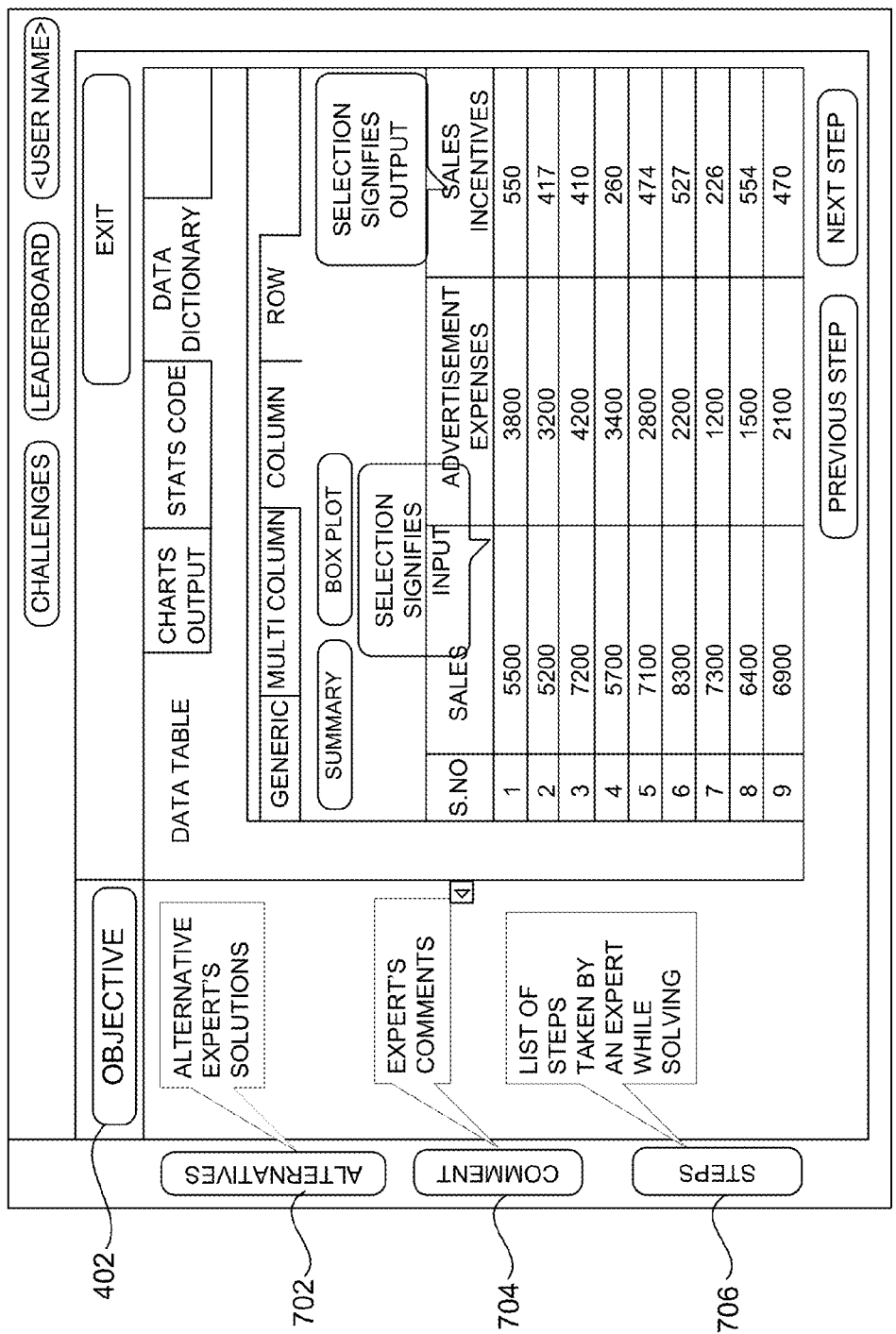
FIG. 7 illustrates a user interface view of an expert solution sheet for the at least one challenge according to an embodiment herein.
Figure 8:
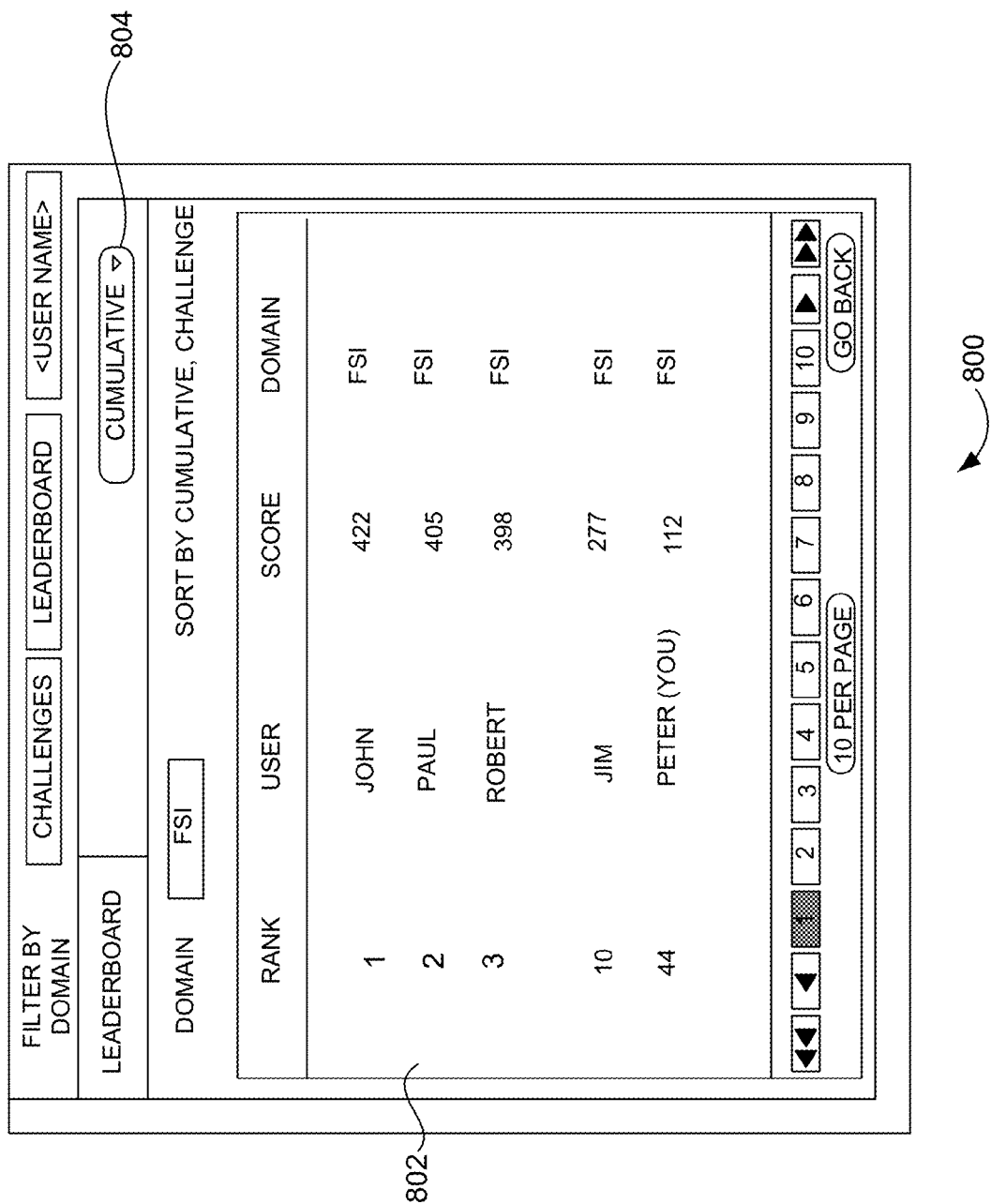
FIG. 8 illustrates a user interface view of a consolidated rank sheet of the user specific to one or more challenges according to an embodiment herein.

FIG. 7 illustrates a user interface view of an expert solution sheet for the at least one challenge according to an embodiment herein. The view 700 includes an alternatives field 702, a comment field 704, and a steps field 706. The alternatives field 702 provides an alternative expert solution for a particular challenge performed by a user. The comment field 704 provides one or more comments as an expert solution for the challenge to the user. The steps field 706 provides the one or more steps followed by an expert for a particular challenge performed by the user 102. For example, a challenge may include a table that includes information (e.g., sales, advertisement expenses, sales incentives) about financial status of an industry. Upon selection of sales which signifies an input and similarly the sales incentives signify an output. In one embodiment, the user 102 may click on previous step field 706 to view the previous steps performed by the expert for a particular challenge and similarly the next step field is to view next step performed by the expert for the particular challenge. FIG. 8 illustrates a user interface view of a consolidated rank sheet of the user 102 specific to one or more challenges according to an embodiment herein. The view 800 includes a consolidated rank sheet 802, and a cumulative field 804. The consolidated rank sheet 802 displays the user 102/trainee who have performed one or more challenges with corresponding score earned and domain of learning. For example, one or more users/trainee 'John', 'Paul', 'Robert' who are top three rankers for a challenge in finance domain with corresponding score points earned. In one embodiment, the cumulative field 804 may be used to sort the rank sheet according to the user based on cumulative score. Similarly, the rank sheet may be sorted based on the challenge.

Figure 9:
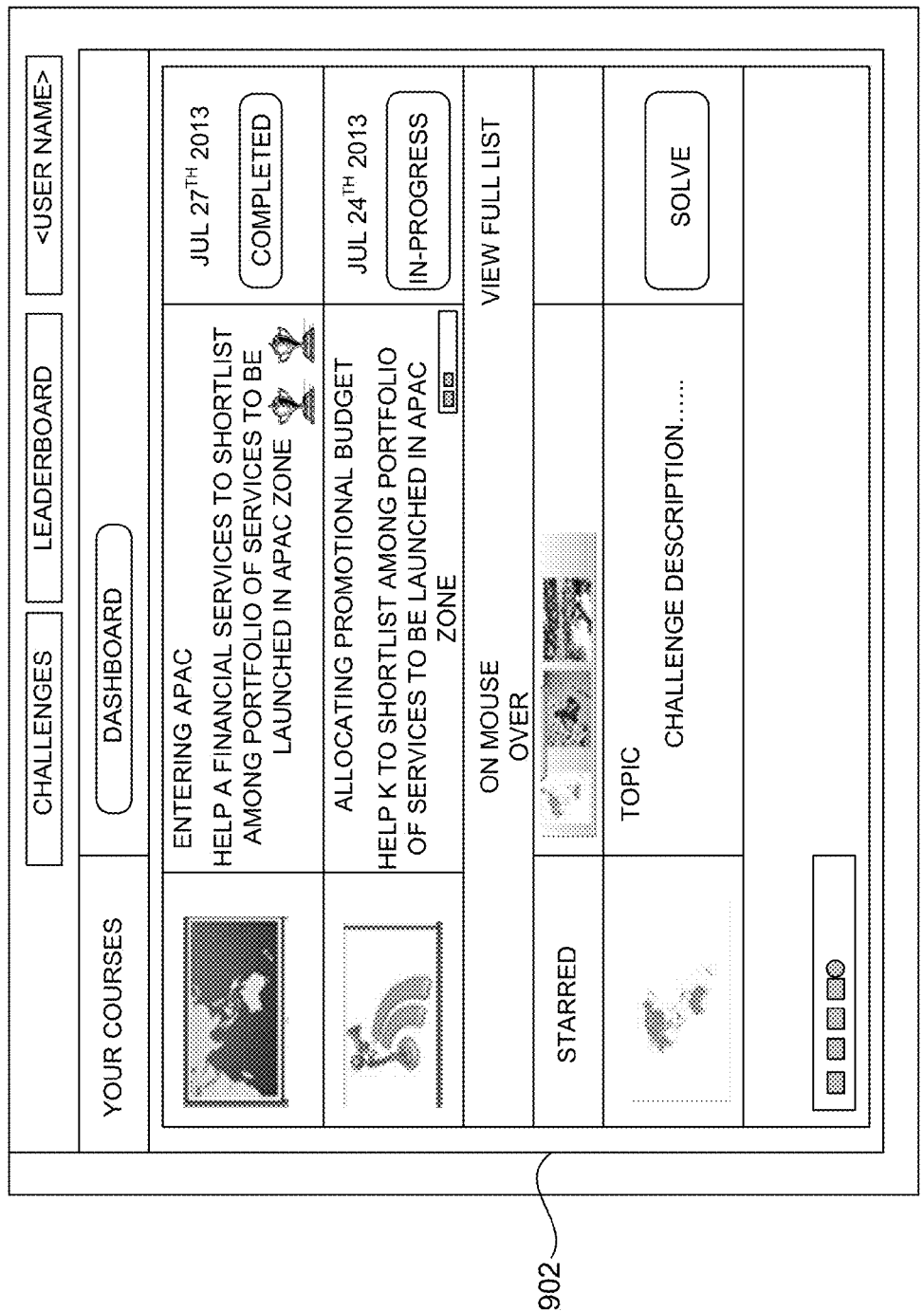
FIG. 9 illustrates a user interface view of an user profile sheet according to an embodiment herein.

FIG. 9 illustrates a user interface view 900 of a user profile sheet according to an embodiment herein. The view 900 includes a starred field 902. In one embodiment, the consolidated courses sheet displays list of courses to the user with corresponding schedule. In one embodiment, the user may add one or more courses to his profile (e.g., add to favorites) when he/she clicks on the starred field 902.

Figure 10:
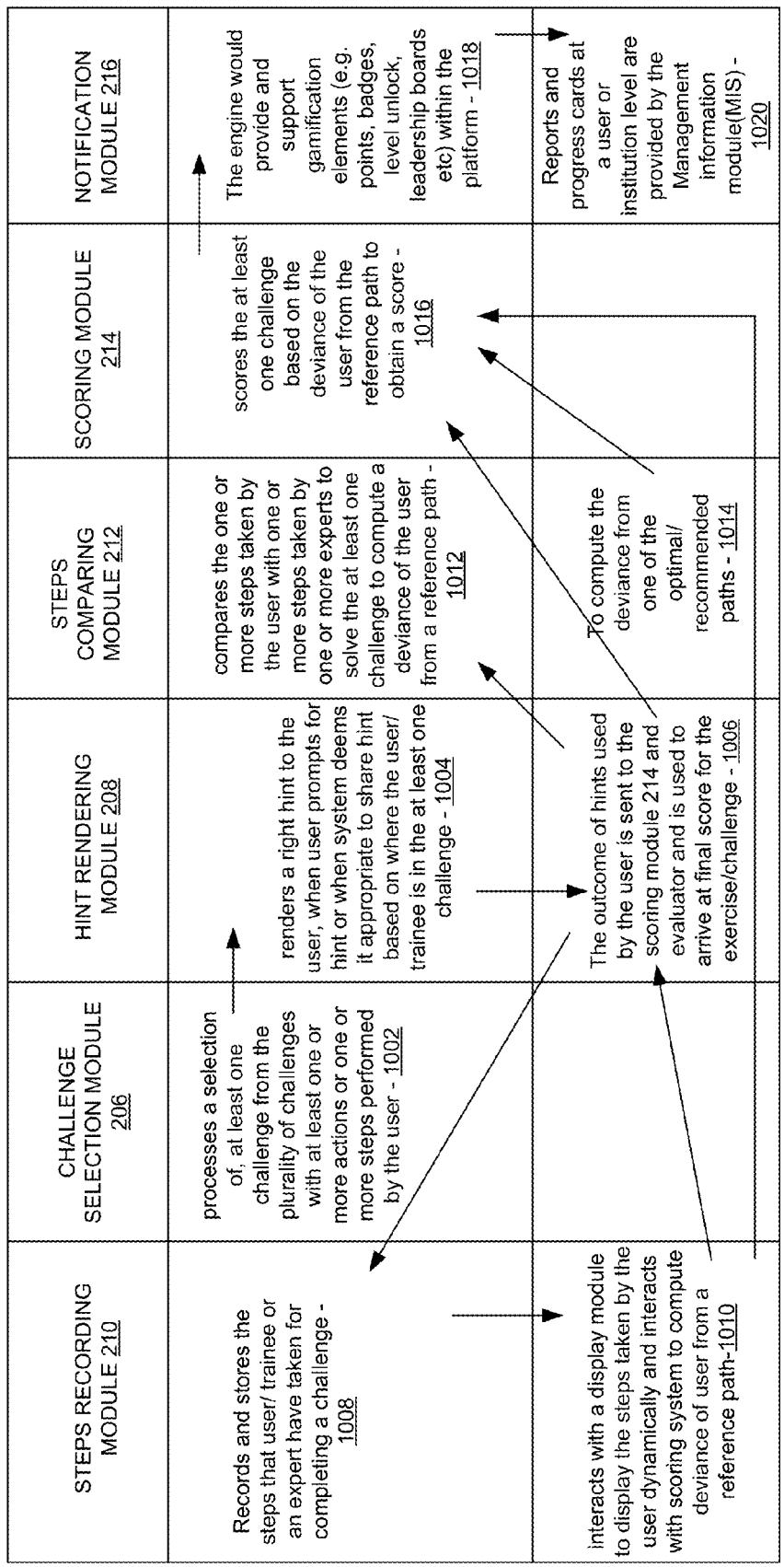
FIG. 10 is an interaction diagram illustrating a processor implemented method for training and scoring one or more challenges taken by a user using a simulation based learning platform according to an embodiment herein.

FIG. 10 is an interaction diagram illustrating a processor implemented method for training and scoring one or more challenges taken by the user 102 using the simulation based learning platform 106 according to an embodiment herein. The interaction diagram 1000 includes a series of operations carried out during various stages of interaction between the challenge selection module 206, the hint rendering module 208, the steps recording module 210, the steps recording module 210, the scoring module 214 and the notification module 216. In operation 1002, performs one or more user actions/ steps and gives results. For example, user action is 'a user clicks' on solving an at least one challenge from a plurality of challenges. In operation 1004, the hint and instruction module 208 may render a right hint to the user, when user prompts for hint or when system deems it appropriate to share hint based on where the user/trainee is in the at least one challenge. In operation 1006, an outcome of hints used by the user is sent to the scoring module 214 and evaluator which is used to arrive at final score for the exercise/challenge. In operation 1008, the steps recording module 210 records and stores the steps that user/ trainee or an expert have taken for completing a challenge. In operation 1010, interacts with a display module to display the steps taken by the user dynamically and interacts with scoring system to compute deviance of user from a reference path.

In operation 1012, the steps comparing module 212 compares the one or more steps taken by the user with one or more steps taken by one or more experts to solve the at least one challenge to compute a deviance of the user from a reference path. In operation 1014, the steps comparing module 212 compute the deviance from one of the optimal/recommended paths. In operation 1016, the scoring module 214 scores the at least one challenge based on the deviance of the user from the reference path to obtain a score. In operation 1018, the notification module 216 provides and support gamification elements (e.g. points, badges, level unlock, leadership boards etc) within the platform. In operation 1020, reports and progress cards at a user or institution level are provided by the management information module (MIS).

Figure 11:
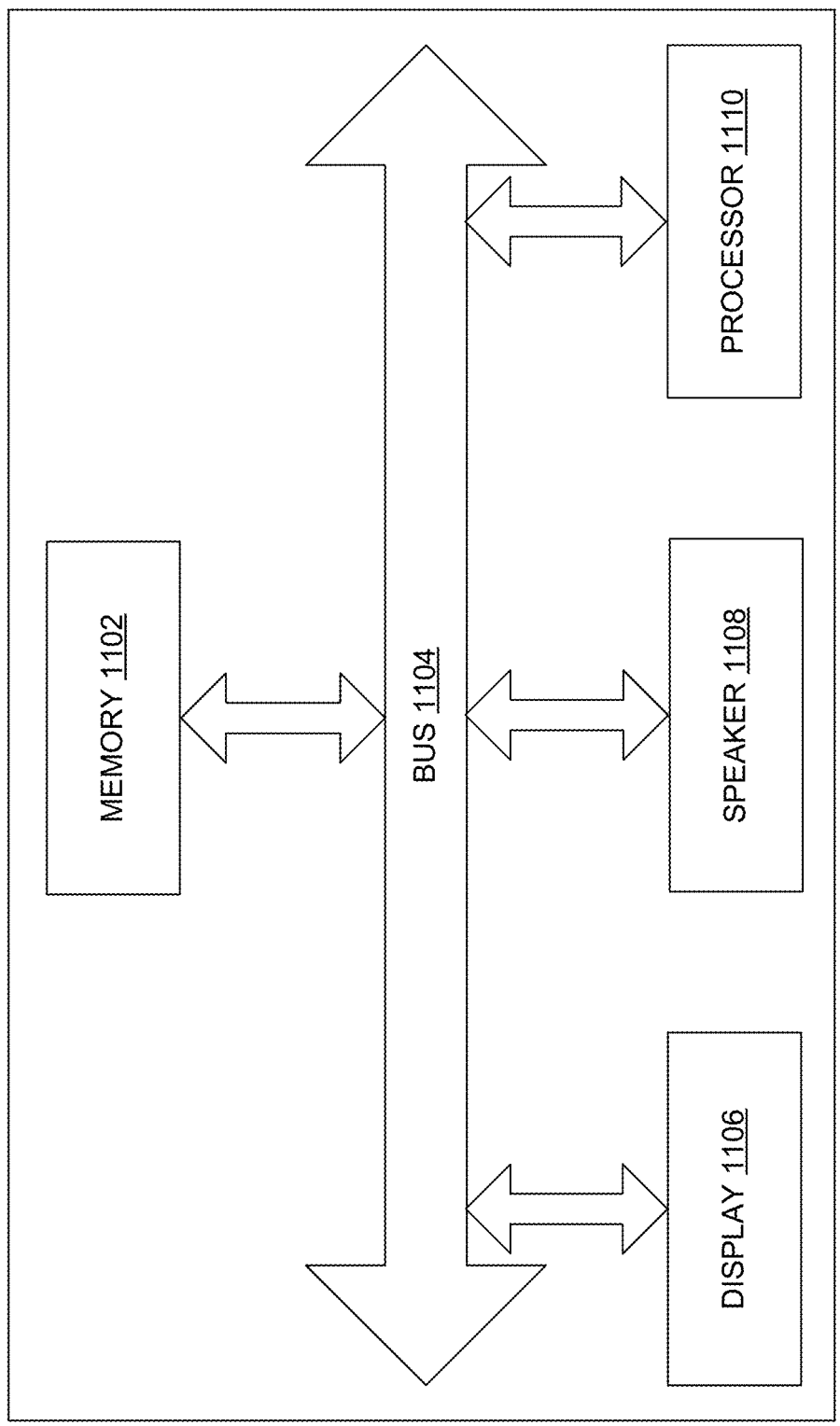
FIG. 11 illustrates an exploded view of the computing device having an a memory having a set of computer instructions, a bus, a display, a speaker, and a processor capable of processing a set of instructions to perform any one or more of the methodologies herein, according to an embodiment herein.

FIG. 11 illustrates an exploded view of the computing device 104 having a memory 1102 having a set of computer instructions, a bus 1104, a display 1106, a speaker 1108, and a processor 1110 capable of processing a set of instructions to perform any one or more of the methodologies herein, according to an embodiment herein. In one embodiment, the receiver may be the computing device 104. The processor 1110 may also enable digital content to be consumed in the form of video for output via one or more displays 1106 or audio for output via speaker and/or earphones 1108. The processor 1110 may also carry out the methods described herein and in accordance with the embodiments herein.

Digital content may also be stored in the memory 1102 for future processing or consumption. The memory 1102 may also store program specific information and/or service information (PSI/SI), including information about digital content (e.g., the detected information bits) available in the future or stored from the past. A user of the computing device 104 may view this stored information on display 1106 and select an item of for viewing, listening, or other uses via input, which may take the form of keypad, scroll, or other input device(s) or combinations thereof. When digital content is selected, the processor 1110 may pass information. The content and PSI/SI may be passed among functions within the computing device using the bus 1104.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Figure 12:
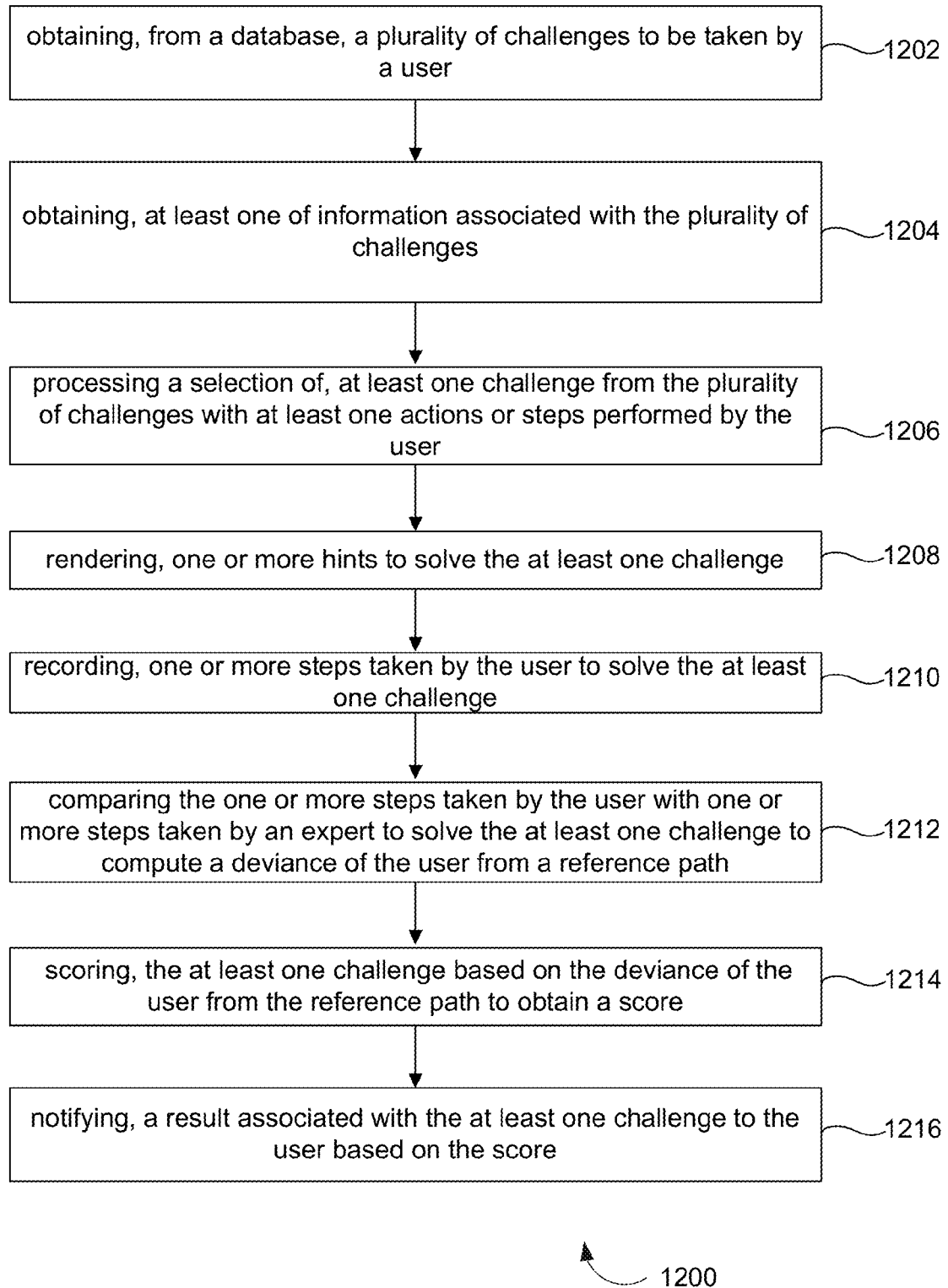
FIG. 12 is a flow diagram illustrates a method for training and scoring one or more challenges taken by a user using a simulation based learning platform according to an embodiment herein.

FIG. 12 is a flow diagram illustrates a method for training and scoring one or more challenges taken by a user using a simulation based learning platform according to an embodiment herein. In accordance with one or more aspects of the present invention, a computer implemented method for analytics training 1200 using statistical functions may be provided wherein an associated analytics training system may include an intelligence based machine learning engine. In step 1202, a plurality of challenges to be taken by a user is obtained from a database. In step 1204, at least one of information associated with the one or more challenges is obtained. In step 1206, at least one challenge from the plurality of challenges is processed by selection with at least one action or steps performed by the user. In step 1208, one or more hints to solve the at least one challenge is rendered. In step 1210, one or more steps taken by the user to solve the at least one challenge is recorded. In step 1212, the one or more steps taken by the user is compared with one or more steps taken by an expert to solve the at least one challenge to compute a deviance of the user from a reference path. In step 1214, the at least one challenge is scored based on the deviance of the user from the reference path to obtain a score. In step 1216, a result associated with the at least one challenge is notified to the user based on the score. The at least one of information associated with the plurality of challenges is selected from a group includes (i) a description, (ii) an objective, (iii) data sets that are created or provisioned, (iv) rules of navigation, (v) key steps, and (vi) success criteria among other related components.

The processor implemented method may further includes, one or more solutions are provided in a format selected from a group which includes, (i) one or more audio, (ii) one or more video, (iii) one or more text, or (iv) a combination thereof. The processor implemented method may further includes, (i) tracking a progress associated with the at least one challenge, (ii) displaying a progress indicator for the at least one challenge taken by the user. The progress indicator includes (i) a progress level of the user associated with the at least one challenge, or (ii) a comparison of a performance between (i) the user and the one or more experts, (ii) the user and the one or more users, or (iii) combinations thereof. The performance includes the one or more parameters.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 13:
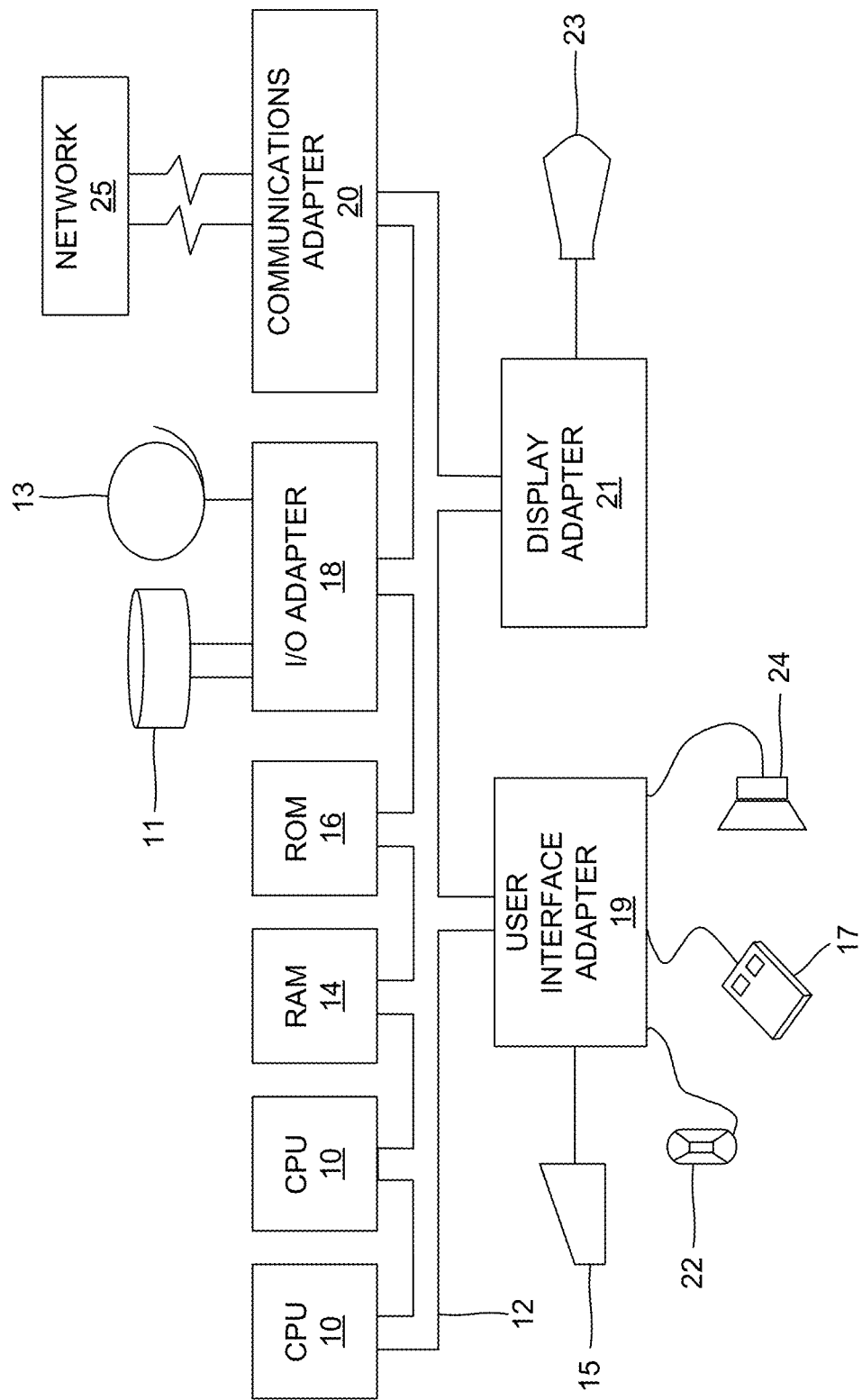
FIG. 13 a schematic diagram of computer architecture used in accordance with the embodiment herein.

A representative hardware environment for practicing the embodiments herein is depicted in FIG. 13. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The simulation based learning platform 106 provides a conceptual learning, an immersive and interactive learning based on simulation and real business cases where the learner will experience in an analytics career. The user/trainee does not require prior knowledge on statistical code. The simulation based learning platform 106 provides application of concepts on real time data and on real time challenges. The simulation based learning platform 106 simulates a real business scenario and allows a user to explore the data as he/she deems fit and appropriate. The simulation based learning platform 106 segments analytics/statistical learning and allows a user to focus application of business, analytic and statistical concepts separate from a mechanics of tools and programming.

The simulation based learning platform 106 facilitates learning by allowing the user to focus on choosing a right/optimal step and an application/execution, which may interface with the chosen package (e.g. a' or 'SAS' among others for statistics/business analytics/optimization). There exists a combination of objective and descriptive questions at critical point to test concepts. The instruction and hints facilitate the user and his/her progress on completion of the challenge. An intelligent scoring which helps in determination of the user's score and determine areas of improvement. Comparison of user steps and actions against expert's recommended approach helps in identifying areas of deviation.

The simulation based learning platform 106 enables a collaboration, intelligent scoring and learning by experience. The simulation based learning platform 106 enables the user/analyst to quickly go up the learning curve, and reduce time spent on training a user/analyst. The simulation based learning platform 106 provides extensive and broad exposure to many practical and relevant real life experiences through use cases and simulated journeys to solve business challenges. The simulation based learning platform 106 which enables the user/analyst to define the problem thoroughly before arriving at a solution. The simulation based learning platform 106 quantifies business impact at every step and helps to train the user/analyst, and script a story to implement for the impact, for every analytical solution given.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor implemented method for scoring a plurality of challenges taken by a user, and training said user using a simulation based learning platform, said processor implemented method comprising:

providing a network server, wherein the network server includes a database for storing data associated with a plurality of challenges to be taken by a user;

providing a simulation-based learning platform for teaching analytics, wherein said simulation-based learning platform is a web-based interactive-learning platform comprising a plurality of modules configured to engage the network server, including:

(a) a challenge information obtaining module configured for retrieving information associated with the plurality of challenges;

(b) a challenge selection module configured for processing the plurality of challenges to be taken by a user;

(c) a hint rendering module configured for rendering one or more hints to assist a user in solving at least one challenge of the plurality of challenges to be taken by the user;

(d) a steps recording module configured for recording one or more steps taken in a solution path by the user to solve said at least one challenge, wherein the steps recording module is further configured (i) to determine steps taken in a solution path that alter at least one information associated with the plurality of challenges from said one or more steps taken in a solution path taken by the user using a built-in intelligence, and (ii) to highlight steps taken in a solution path with one or more color codes to (a) specify a status of said steps taken in a solution path or (b) progress of said at least one challenge by said user;

(e) a steps comparing module for comparing steps taken in a solution path taken by the user with one or more steps taken by one or more experts to solve said at least one challenge to compute a deviance of the user from a reference path;

(f) a scoring module configured to determine a score for at least one challenge based on the deviance of the user from the reference path, wherein the score is calculated using one of more parameters selected from a group of parameters comprising (i) an usage of one or more statistical functions in said one or more steps to solve said at least one challenge and (ii) an exhaustiveness of functions among other parameters to arrive the user score;

(g) a machine learning module configured to improve performance of the simulation-based learning platform, wherein the machine learning module engages the steps recording module and the machine learning module engages the scoring module, wherein the machine learning module identifies steps taken in a solution path, computes a deviance between steps in the solution path from steps in a reference path using statistical functions to obtain a score, wherein the score is used to track progress of a user by comparing a performance between the user and one or more experts, wherein the computed deviance is also used to discover an optimal recommended solution path for a challenge;

(h) a statistics package updating module, wherein the statistics package updating module is configured for automated enhancement of statistical functions associated with the scoring module; and (i) a notification module configured to provide information about results associated with said at least one challenge to the user based on said score;

providing a plurality of categories related to an industry to be selected by said user on said web-based interactive-learning platform;

providing information related to a domain of learning when said user selects said plurality of categories;

classifying said industry when said user selects said plurality of categories;

obtaining, from the database, the plurality of challenges to be taken by said user;

obtaining at least one information associated with said plurality of challenges, wherein said at least one information associated with said plurality of challenges is selected from a group comprising (I) a description, (II) an objective, (III) data sets that are created or provisioned, (IV) rules of navigation, (V) key steps, and (VI) success criteria among other related components;

processing a selection of at least one challenge from said plurality of challenges with at least one action or step performed by said user;

rendering one or more hints to solve said at least one challenge;

providing said one or more hints for completing instructions, and progressing said one or more hints to complete said at least one challenge;

recording one or more steps taken in a solution path by said user to solve said at least one challenge;

determining steps taken in a solution path that alter said at least one information associated with said plurality of challenges from said one or more steps performed by said user using a built-in intelligence associated with the machine learning module;

highlighting said steps taken in a solution path with one or more color code to (a) specify a status of said steps taken in a solution path or (b) progress of said at least one challenge by said user;

comparing said steps taken in a solution path by said user with one or more steps taken by an expert to solve said at least one challenge to compute a deviance of said user from a reference path;

scoring, said at least one challenge based on said deviance of said user from said reference path to obtain a score, wherein said score is calculated using parameters selected from a group comprising (i) an usage of one or more statistical functions in said one or more steps to solve said at least one challenge and (ii) an exhaustiveness of functions among other parameters to arrive at user score; and notifying, a result associated with said at least one challenge to said user based on said score.

2. The processor implemented method of claim 1, further comprising, (i) computing, by a rule engine module, custom rules for said data sets which are built based on a type of data, or (ii) applying, an existing or newly-built rules to said datasets corresponding to said user challenge, wherein said custom rules are applicable for certain variables or columns based on a context of data; and wherein the machine learning module engaging the scoring module is configured for generating an optimal path for said at least one challenge.

3. The processor implemented method of claim 1, wherein said one or more hints is provided to said user (i) upon receiving one or more prompts from said user, (ii) at predetermined time intervals based on one or more steps taken in a solution path by said user to solve said challenge, (iii) a user level, (iv) admin settings, and (v) user proficiency.

4. The processor implemented method of claim 1, further comprising, providing, one or more solutions comprising one or more steps taken to solve said at least one challenge by (a) one or more experts, or (b) one or more users to said users, wherein said one or more solutions further comprises (i) one or more recommendations or one or more suggestions to solve said at least one challenge, (ii) one or more reasons for said one or more steps taken to solve said at least one challenge by said one or more experts or said one more users, or (iii) combination thereof.

5. The processor implemented method of claim 4, further comprising, displaying said one or more statistical functions to be used in said one or more steps to solve said at least one challenge, wherein said one or more statistical functions are displayed based on one or more solutions obtained from said one or more experts or said one or more users.

6. The processor implemented method of claim 5, wherein said score is calculated based on one or more parameters selected from a group comprising (i) a time taken to solve said at least one challenge, (ii) sequence of steps taken in a solution path, (iii) one or more hints used to solve said at least one challenge, and (iv) answers to intermediate questions within said at least one challenge and at end of said at least one challenge.

7. The processor implemented method of claim 5, further comprising, providing, one or more solutions in a format selected from a group comprising, (i) one or more audio, (ii) one or more video, (iii) one or more text, or (iv) a combination thereof.

8. The processor implemented method of claim 6, further comprising, tracking a progress associated with said at least one challenge, wherein tracking a progress includes displaying a progress indicator for said at least one challenge taken by said user, wherein said progress indicator comprises (a) a progress level of said user associated with said at least one challenge, or (b) a comparison of a performance between (I) said user and said one or more experts, (II) said user and said one or more users, or (III) combinations thereof, and wherein said performance comprises said one or more parameters.

9. A computer implemented system for scoring a plurality of challenges taken by a user and training said user using a simulation based learning platform, said computer implemented system comprising:

(i) a processing unit; and (ii) memory to store instructions that, when executed by the processing unit, cause the processing unit to:

(a) enable a simulation-based learning platform for teaching analytics, wherein said simulation-based learning platform is a web-based interactive-learning platform comprising a plurality of modules configured to engage a network server having a database configured for storing (i) one or more user information (ii) information corresponding to content associated with course and challenge, wherein said simulation-based learning platform includes machine-learning and intelligent scoring, and wherein said simulation-based learning platform is configured to (iii) provide a plurality of categories related to an industry to be selected by a user on said web-based interactive-learning platform, (iv) provide information related to a domain of learning when said user selects said plurality of categories and (v) classifying said industry when said user selects said plurality of categories, and wherein said simulation-based learning platform comprises a plurality of modules configured to engage the network server, including;

(i) a challenge information obtaining module having instructions that when executed by said processing unit obtains at least one information associated with a plurality of challenges, wherein said plurality of challenges are obtained from said database;

(ii) a challenge selection module having instructions that when executed by said processing unit processes a selection of at least one challenge from said plurality of challenges with one or more actions or one or more steps performed by said user;

(iii) a hint rendering module having instructions that when executed by said processing unit renders one or more hints to solve said at least one challenge, wherein said hint rendering module renders said one or more hints into corresponding a code required by said simulation based learning platform, wherein said one or more hints are converted to different programming and computing instructions with scores and assessment for experiential learning on analytics, wherein said experiential learning is segmented into at least two phases, wherein said hint rendering module provides said one or more hints for completing instructions and progressing said one or more hints to complete said at least one challenge;

(iv) a steps recording module having instructions that when executed by said processing unit records one or more steps taken by said user to solve said at least one challenge, wherein said steps recording module is configured (i) to determine steps taken in a solution path that alter at least one information associated with the plurality of challenges from said one or more steps taken in a solution path by the user using a built-in intelligence, and (ii) to highlight steps taken in a solution path with one or more color codes to (a) specify a status of said steps taken in a solution path or (b) progress of said at least one challenge by said user;

(v) a steps comparing module having instructions that when executed by said processing unit compares said steps taken in a solution path by said user with one or more steps taken by one or more experts to solve said at least one challenge to compute a deviance of said user from a reference path;

(vi) a scoring module having instructions that when executed by said processing unit determines a score for at least one challenge based on said deviance of said user from said reference path, wherein the score is calculated using one of more parameters selected from a group of parameters comprising (a) an usage of one or more statistical functions in said one or more steps to solve said at least one challenge and (b) an exhaustiveness of functions among other parameters to arrive the user score;

(vii) a machine learning module configured to improve performance of the simulation-based learning platform, wherein the machine learning module has instructions that when executed by the processing unit engages the steps recording module and the machine learning module has instructions that when executed by the processing unit engages the scoring module, wherein the machine learning module identifies steps taken in a solution path, computes a deviance between steps in the solution path from steps in a reference path using statistical functions to obtain a score, wherein the score is used to track progress of a user by comparing a performance between the user and one or more experts, wherein the computed deviance is also used to discover an optimal recommended solution path for a challenge;

(viii) a statistics package updating module having instructions that when executed by the processing unit provides automated enhancement of statistical functions within said simulation-based learning platform; and (ix) a notification module having instruction that when executed by said processing unit notifies results associated with said at least one challenge to said user based on said score.

10. The computer implemented system of claim 9, further comprising, a rule engine module has instructions that when executed by said processing unit (i) computes custom rules for said data sets which are built based on a type of data, or (ii) applies an existing or newly-built rules to said datasets corresponding to said user challenge, wherein said custom rules are applicable for certain variables or columns based on a context of data; and wherein the machine learning module engaging the scoring module has instructions that when executed by the processing unit generate an optimal path for said at least one challenge.

11. The computer implemented system of claim 9, wherein said one or more hints is provided to said user (i) upon receiving one or more prompts from said user, (ii) at predetermined time intervals based on one or more steps taken in a solution path by said user to solve said challenge, (iii) a user level, (iv) admin settings, and (v) user proficiency.

12. The computer implemented system of claim 9, wherein said at least one of information associated with said plurality of challenges is selected from a group comprising (i) a description, (ii) an objective, (iii) data sets that are created or provisioned, (iv) rules of navigation, (v) key steps, and (vi) success criteria among other related components.

13. The computer implemented system of claim 9, wherein the notification module further comprises instructions the when executed by said processor, notifies results associated with said plurality of challenges to said user based on at least a plurality of gamification elements selectable from the group consisting of: (i) points; (ii) badges; (iii) level unlock; and (iv) leadership boards.

14. The computer implemented system of claim 9, wherein one or more solutions comprises one or more steps taken to solve said at least one challenge provided by (a) one or more experts, or (b) one or more users to said users, wherein said one or more solutions further comprises (i) one or more recommendations or one or more suggestions to solve said at least one challenge, (ii) one or more reasons for said one or more steps taken to solve said at least one challenge by said one or more experts or said one more users, or (iii) combinations thereof.

15. The computer implemented system of claim 14, further comprising, a display module having instructions that when executed by said processor displays said one or more statistical functions to be used in said one or more steps to solve said at least one challenge, wherein said one or more statistical functions are displayed based on one or more solutions obtained from said one or more experts or said one or more users.

16. The computer implemented system of claim 15, wherein said score is calculated based on one or more parameters selected from a group comprising (i) a time taken to solve said at least one challenges, (ii) sequence of steps taken in a solution path, (iii) one or more hints used to solve said at least one challenge, and (iv) answers to intermediate questions within said at least one challenge and at end of said at least one challenge.

17. The computer implemented system of claim 9, further comprising, a playback module, executed by said processor, that playbacks each step taken in a solution path by said user or said expert while solving said at least one of challenge.

18. The computer implemented system of claim 16, further comprising, a progress tracking module for tracking a progress associated with said at least one challenge, wherein the tracking module includes a progress indicator for said at least one challenge taken by said user, wherein said progress indicator comprises (a) said progress of said user associated with said at least one challenge, or (b) a comparison of a performance between (I) said user and said one or more experts, (II) said user and said one or more users, or (III) combinations thereof, and wherein said performance comprises said one or more parameters.

19. The computer implemented system of claim 9, a performance determination module, executed by said processor that determines a performance level based on at least a subset of said plurality of challenges taken by said user.

20. The computer implemented system of claim 9, a training determination and recommendation module, executed by said processor, that (a) determines a knowledge level based on said performance level during an attempt made by said user to solve (i) said at least one challenge, (ii) said subset, or (iii) said plurality of challenges, and (b) recommends one or more training courses based on (i) said performance level or (ii) said knowledge level to solve subsequent challenges.

21. A non-transitory computer readable storage medium embodying instructions, which when executed by a processor performs operations comprising:

enabling a web-based interactive-learning, simulation-based, learning platform for teaching analytics, having a plurality of modules configured to engage a network server, wherein the database is configured for storing information associated with a plurality of challenges to be taken by a user;

selecting from the database a plurality of categories related to an industry;

retrieving information related to a domain of learning associated with a selection of said plurality of categories;

classifying the industry associated with said selection of said plurality of categories;

obtaining, from a database, a plurality of challenges to be taken by said user;

obtaining, at least one information associated with said plurality of challenges, wherein said at least one information associated with said plurality of challenges is selected from a group comprising (i) a description, (ii) an objective, (iii) data sets that are created or provisioned, (iv) rules of navigation, (v) key steps, and (vi) success criteria among other related components;

processing a selection of, at least one challenge from said plurality of challenges with at least one action or step performed by said user;

rendering, one or more hints to solve said at least one challenge;

providing said one or more hints for completing instructions, and progressing said one or more hints to complete said at least one challenge;

recording, one or more steps taken by said user to solve said at least one challenge;

determining steps taken in a solution path that alter said at least one information associated with said plurality of challenges from said one or more steps performed by said user using a built-in intelligence;

highlighting said steps taken in a solution path with one or more color code to (a) specify a status of said steps taken in a solution path or (b) progress of said at least one challenge by said user;

comparing said steps taken in a solution path by said user with one or more steps taken by an expert to solve said at least one challenge to compute a deviance of said user from a reference path;

scoring, said at least one challenge based on said deviance of said user from said reference path to obtain a score, wherein said score is based on parameters selected from a group comprising (a) an usage of one or more statistical functions in one or more steps to solve said at least one challenge and an exhaustiveness of functions among other parameters to arrive at user score;

displaying a result associated with said at least one challenge to said user based on said score; and enabling a machine learning module configured for generating an optimal path for said at least one challenge, wherein the machine learning module identifies steps taken in a solution path, computes a deviance between steps in the solution path from steps in a reference path using statistical functions to obtain a score, wherein the score is used to track progress of a user by comparing a performance between the user and one or more experts, wherein the computed deviance is also used to discover an optimal recommended solution path for a challenge.

22. The non-transitory computer readable storage medium of claim 21, further comprising, determining a performance level based on at least a subset of said plurality of challenges taken by said user.

23. The non-transitory computer readable storage medium of claim 21, further comprising, (a) determining a knowledge level based on said performance level during an attempt made by said user to solve (i) said at least one challenge, (ii) said subset, or (iii) said plurality of challenges, and (b) recommending one or more training courses based on (i) said performance level or (ii) said knowledge level to solve subsequent challenges.

* * * * *